United States Patent [19]
Griffin

[11] 3,731,581
[45] May 8, 1973

[54] MUSIC TEACHING AID
[76] Inventor: Lucy E. Griffin, 3661 Charleswood, Memphis, Tenn. 38122
[22] Filed: Aug. 10, 1971
[21] Appl. No.: 170,469

[52] U.S. Cl..................................................84/471
[51] Int. Cl..............................................G09b 15/02
[58] Field of Search......................84/470, 471, 478, 84/485

[56] References Cited

UNITED STATES PATENTS

| | | | |
|---|---|---|---|
| 1,045,021 | 11/1912 | Hartman | 84/478 |
| 1,433,850 | 10/1922 | Schnitker | 84/471 |
| 3,129,628 | 4/1964 | Hall | 84/471 |
| 3,554,074 | 1/1971 | Rickey | 84/471 X |

Primary Examiner—Richard B. Wilkinson
Assistant Examiner—Lawrence R. Franklin
Attorney—John R. Walker, III

[57] ABSTRACT

A device or aid used for teaching key signatures in music. The device includes a plurality of key-shaped members, one for each key signature having indicia thereon indicating the music key, and the device includes a hanger to removably hang the key-shaped members adjacent one another for selection by the pupil. The key-shaped members representing key signatures composed of sharps are provided with pointed protrusions representing the number of sharps in the key signature, and the key-shaped members representing key signatures composed of flats are provided with squared protrusions representing the number of flats in the key signature.

4 Claims, 32 Drawing Figures

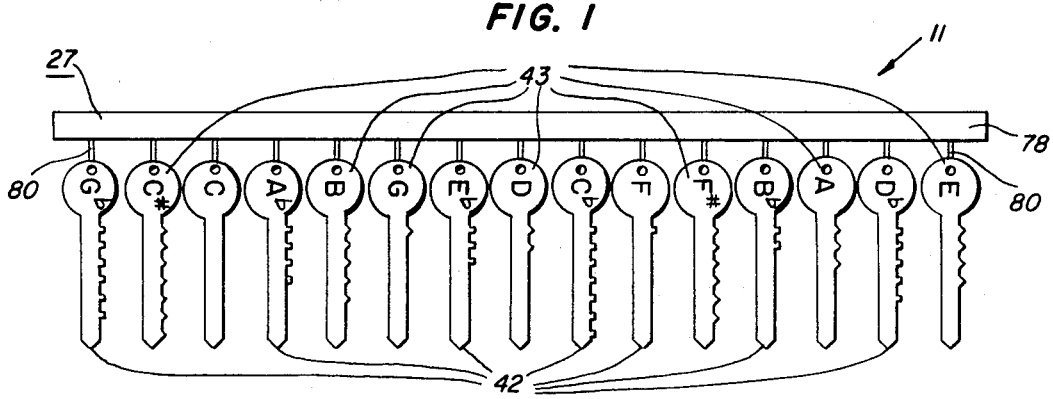
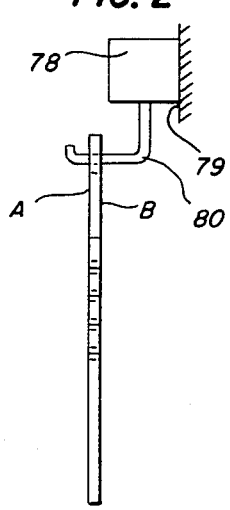
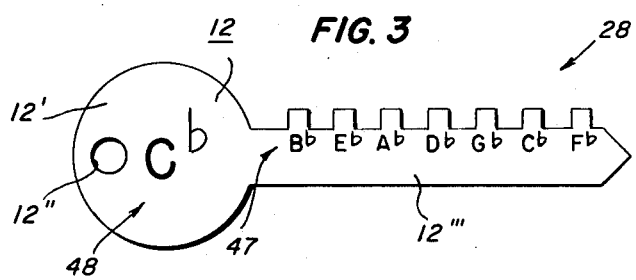
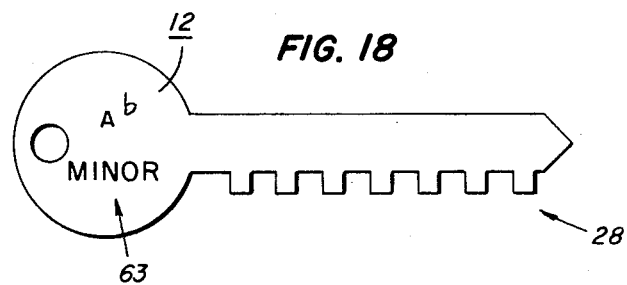
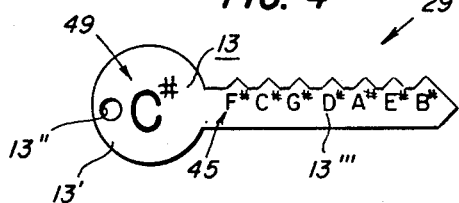
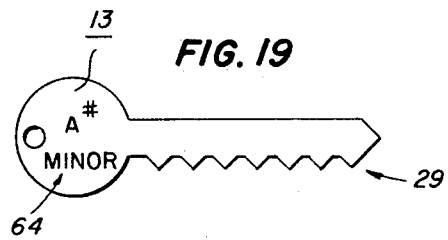
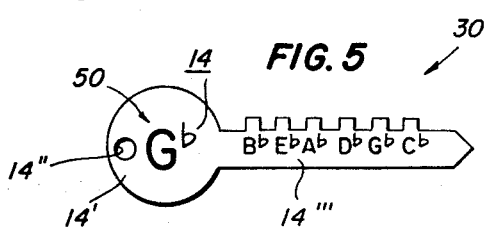
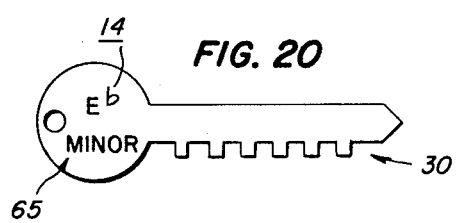

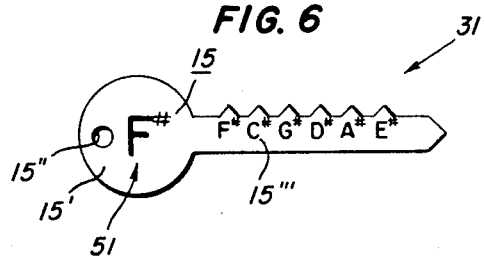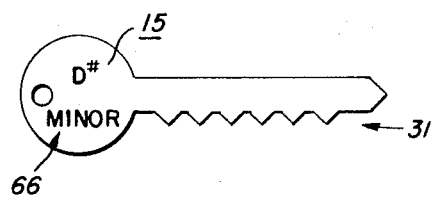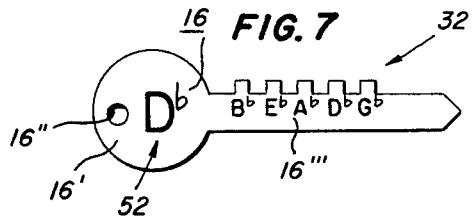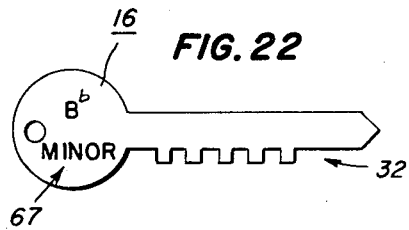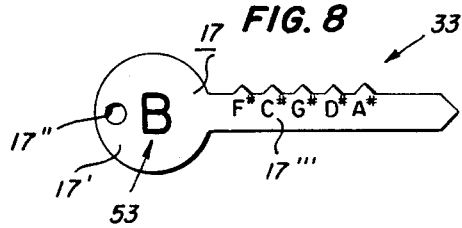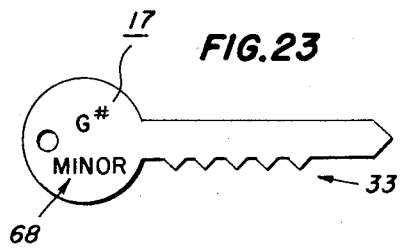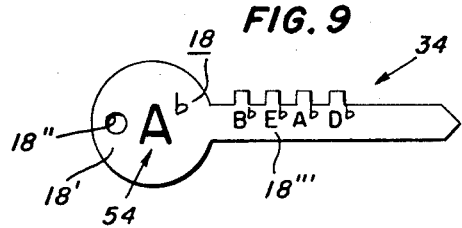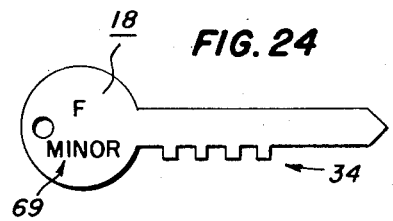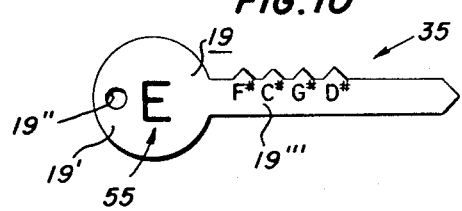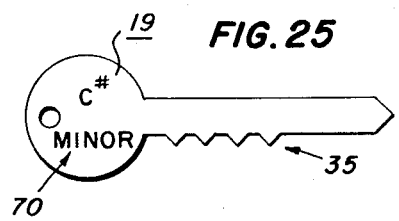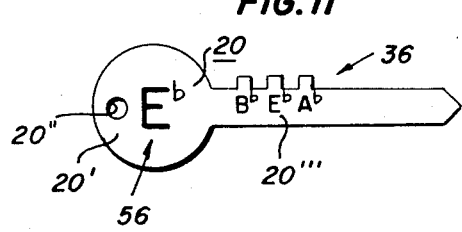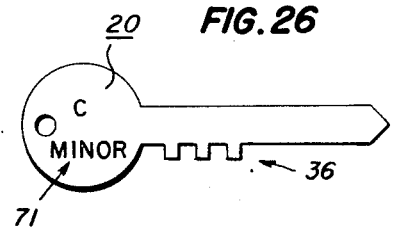

PATENTED MAY 8 1973

INVENTOR.
LUCY E. GRIFFIN
BY John R. Walker, III
Attorney

MUSIC TEACHING AID

BACKGROUND OF THE INVENTION

1. Field of the Invention

This invention relates to teaching devices or aids in the field of music.

2. Description of the Prior Art

Heretofore, there have been various devices which are used in conjunction with the keyboard of a piano for indicating to the student the particular keys to be struck in the teaching of scales or chords. A preliminary search disclosed the following patents showing various devices placed adjacent the keyboard U.S. Pat. Nos. 1,328,718; 1,558,257; 2,381,347; 2,807,183; 3,395,600; and RE 24,195. None of these patents disclose a means such as applicant's for teaching signatures in music.

SUMMARY OF THE INVENTION

This invention is directed towards providing a device or aid in teaching key signatures, particularly to children, although it is not limited to children. The means by which the concept of the present invention is accomplished is by providing a plurality of key-shaped members which are hung on a hanger and adapted to be selected by the pupil to "unlock" scales, so to speak, and set signatures in the pupil's mind to prepare him for performing in a certain key. Thus, the pupil takes the key-shaped member, which simulates an actual key for a lock, and immediately sees that for a given music key, certain sharps or flats appear and, when observed, lead the pupil into the key signature. To teach major scales: The head of the key-shaped member has indicia thereon indicating the signature key. The key-shaped members representing key signatures composed of sharps are provided with pointed protrusions along one edge of the key-shaped member simulating the lock-actuating members on an actual key, and representing the number of sharps in the music key signature. The key-shaped members representing key signatures composed of flats are provided with squared protrusions, also simulating the lock-actuating members in an actual key and representing the number of flats in the key signature. To teach the minor scales: The reverse side of the key-shaped member has indicia indicating the relative minor key, since it has the same signature as the relative major key.

Thus, one of the principal objects of the present invention is to provide a device or aid for teaching key signatures in music, which is "fun" to use and which is an effective means for embedding in the mind of the pupil the key to be used when a certain key signature appears on the sheet music.

A further object is to provide such means which is located away from the piano keyboard so as not to encumber the keyboard or get in the way of the pupil in playing the piano.

A further object is to provide such a device or aid in which the key-shaped members are removably hung on a hanger and positioned so that the pupil can readily select the proper key to be used.

BRIEF DESCRIPTION OF THE DRAWING

FIG. 1 is a front elevational view of the device of the present invention.

FIG. 2 is a side elevational view thereof showing the hanger attached to a supporting surface.

FIGS. 3 – 17 are front elevational views of the key-shaped members of the present invention showing the major key side thereof.

FIGS. 18 – 32 are the rear elevational views or back sides respectively of the key-shaped members of FIGS. 3 – 15, showing the minor key sides of the key-shaped members.

DESCRIPTION OF THE PREFERRED EMBODIMENT

Figure 12:
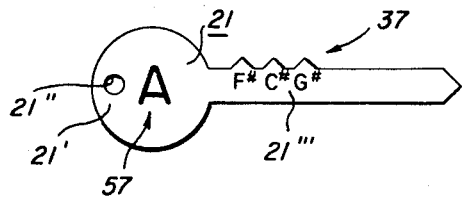
Figure 27:
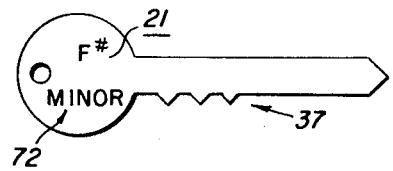
Figure 13:
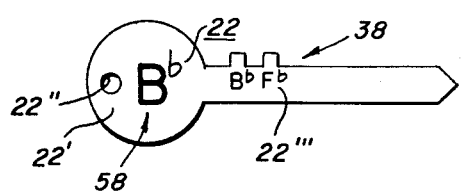
Figure 28:
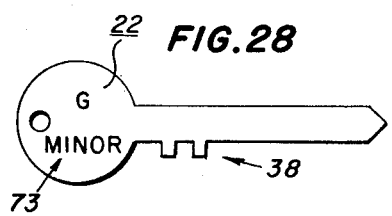
Figure 14:
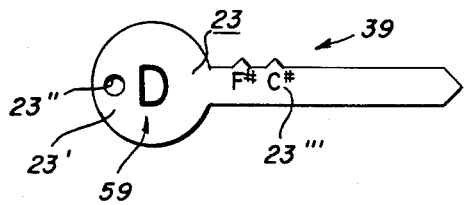
Figure 29:
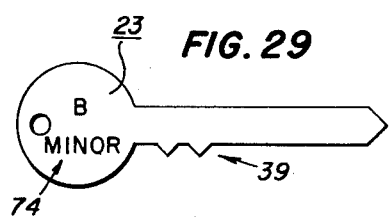
Figure 15:
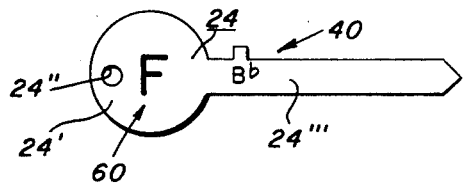
Figure 30:
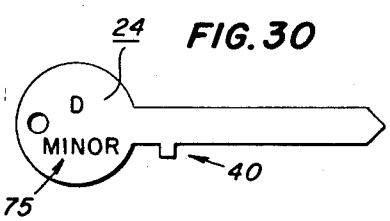
Figure 16:
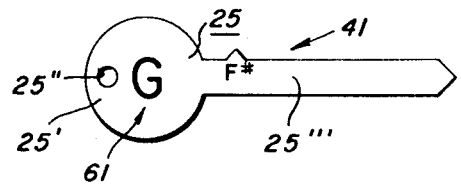
Figure 31:
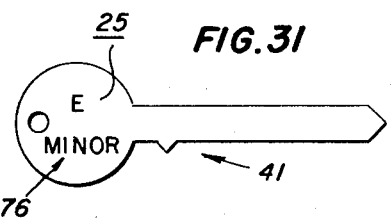
Figure 17:
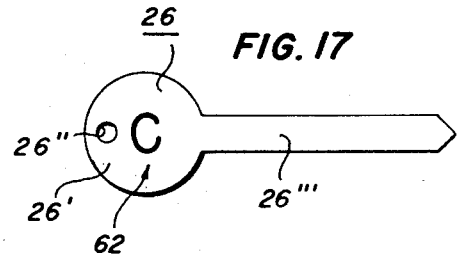
Figure 32:
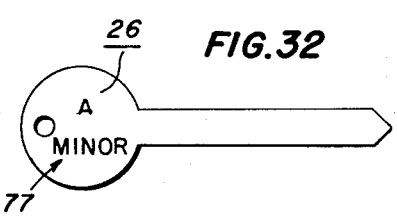

The device 11 of the present invention comprises key-shaped members 12 – 26, which are removably hung on a hanger 27, as best seen in FIGS. 1 and 2. Each of the key-shaped members 12 – 26 has a head, which will be designated by the prime mark for the various key-shaped members. In other words, key-shaped member 12 has a head 12', key-shaped member 13 has a head 13', and so on. Each of the heads 12' – 26' is provided with an aperture therethrough, which is designated by the double prime mark. Thus, the apertures in key-shaped members 12 – 26 are designated respectively 12'' – 26''. Also, each of the key-shaped members has a shank fixedly attached respectively to the heads 12' – 26' and respectively designated by the triple prime marks, as 12''' – 26'''.

It will be noted from the drawings that there are portions 28 – 41 of the respective key-shaped members 12 – 25 along one edge of each of the shanks 12'''– 25''' which simulate the so-called "depths" or "key patterns" which in an actual key are the actuating means for unlocking the lock and distinguish one key from another. It will be noted that the number of the portions 28 – 41 respectively vary from 7 to 1. Also, it will be noted that key-shaped member 26 has no portions corresponding to a "key pattern," for reasons to be discussed hereinafter.

Also, it will be noted that some of the portions 28 – 41 are each in the form of squared protrusions and others are in the form of triangular protrusions. For purposes of clarity, the key-shaped members 12 – 25 are divided into two groups, depending upon whether the protrusions are squared or triangular. Thus, a first group 42 has squared protrusions and includes the key-shaped members 12, 14, 16, 18, 20, 22, and 24. The protrusions of the second group 43 has triangular shaped protrusions and includes keys 13, 15, 17, 19, 21, 23, and 25. In first group 42 the keys 12, 14, 16, 18, 22, and 24 respectively have seven, six, five, four, three, two and one square shaped protrusion or protrusions, which respectively indicate seven, six, five, four, three, two, and one flat or flats in the key signature of the music to be played. Similarly, in second group 43 the keys 13, 15, 17, 19, 21, 23, and 25 respectively have seven, six, five, four, three, two and one triangular shaped protrusion or protrusions which respectively indicates seven, six, five, four, three, two and one sharp or sharps in the key signature of the music to be played. For example, key 13 which has seven triangular protrusions 29 is a key which corresponds to seven sharps when it appears on the key signature of the music to be played. In other words, the pupil seeing seven sharps printed on the music sheet adjacent the treble or bass sign would know that key 13 is the one that corresponds to seven sharps.

Indicia is preferably provided on the front sides A of the keys 12 – 25 adjacent the protrusions 28 – 41 to indicate which notes to sharp in the case of sharps or which notes to strike a half step down in the case of flats. Thus, for example, on key-shaped member 13 the indicia corresponding to F sharp, C sharp, G sharp, D sharp, A sharp, E sharp and B sharp, as at 45, is provided adjacent the respective protrusions 29 to show that for this particular key each time the pupil comes to F, he must "sharp it," each time he comes to C, he must "sharp it," etc. Also, for example, on the key-shaped member 12 is provided the indicia corresponding to B flat, E flat, A flat, D flat, G flat, C flat, and F flat, as at 47, adjacent the protrusions 28 to indicate that when the pupil comes to the note B, it should be struck a half step down, when he comes to the note E, it should be struck a half step down, etc.

On the front sides A of key-shaped members 12 – 26, preferably on the heads 12' – 26' thereof are provided, respectively, indicia C flat, C sharp, G flat, F sharp, D flat, B, A flat, E, E flat, A, B flat, D, F, G and C, respectively as at 48 – 62 which respectively indicate the major keys corresponding to the sharps or flats represented by protrusions 28 – 41. For example, the seven flats 28 on key-shaped member 12 indicate the major key of C flat. Likewise, the seven sharps represented by the protrusions 29 of key-shaped member 13 indicate the major key of C sharp. This same relationship relative to the various major keys is provided on the remaining key-shaped members 14 – 26 in the same manner as for the relationship above-described for key-shaped members 12 and 13. Thus, key-shaped members 12 – 26 correspond to all the musical keys.

On the back sides B, opposite from sides A, the key-shaped members 12 – 26 are respectively provided on the heads thereof with the indicia: A flat minor, A sharp minor, E flat minor, D sharp minor, B flat minor, G sharp minor, F minor, C sharp minor, C minor, F sharp minor, G minor, B minor, D minor, E minor, and A minor, indicated respectively as at 63 – 77. Thus, for example, on the back side B of key-shaped member 28 and preferably on the head 12' thereof is provided the indicia "A flat minor," as at 63, to indicate the minor key corresponding to the flats represented by the seven squared portions 28. Likewise, on the back side B of the key-shaped member 13 preferably on the head 13' thereof is provided indicia "A sharp minor" corresponding to the seven sharps represented by the seven portions 29.

The hanger 27 preferably comprises an elongated horizontal bar 78 adapted to be supported from a supporting surface 79 by suitable means, such as screws or the like, not shown. In addition, hanger 27 preferably includes a plurality of hooks 80 fixedly attached to bar 78 and extending outwardly therefrom to removably respectively support key-shaped members 12 – 26 with the hooks 80 respectively extending through the apertures 12'' – 26''. The key-shaped members 12 – 26 may be hung in any order desired and not necessarily in the regular order of key signatures but may be at random and are hung with side A outwardly.

In using the device 11 of the present invention to teach key signatures in music, the pupil observes the key signature, that is, the number of flats or sharps on the printed music to the right of the treble or bass cleft sign and picks out the particular one of the key-shaped members 12 – 26 which corresponds to the key signature, whereupon the pupil can tell the key in which the piece is to be played. For teaching major keys, the pupil observes the sides A which have the indicia 48 – 62 thereon. To be more specific, if the major key is being taught, and if the pupil observes, as for example, six flats on the sheet music, he selects key-shaped member 14 from the hanger 27 and observes that the music should be played in the key of G flat. He also observes that when he comes to each of the notes B flat, E flat, A flat, D flat, G flat, or C flat, that the note is to be played a half step down. Also, if the pupil sees that there are no sharps or flats on the sheet music adjacent the treble or bass sign, then he selects key 26 and observes that the music should be played in the key of C. The pupil would then start playing, and if the piece sounds as if it is the minor tonality, then the pupil would turn the key member over and discover that he is in the relative minor.

From the foregoing, it will be apparent that a very effective means is provided, which is particularly fun to the pupil and which unlocks scales and sets the signatures in the pupil's mind to prepare him for performing in a certain key.

Although the invention has been described with reference to a preferred embodiment, it will be understood that it is not to be so limited since changes and modifications may be made therein which are within the full intended scope of the present invention.

I claim:

1. A music teaching aid comprising a key-shaped member including a head portion and a shank portion extending from said head portion, said shank portion including an edge, portions of said key-shaped member extending outwardly from said edge to indicate the key signature of a piece of music, one side of said key-shaped member being provided with indicia indicating the major key corresponding to the key signature represented by said portions of said key-shaped member.

2. The music teaching aid of claim 1 in which the other side of said key-shaped member from said one side is provided with indicia indicating the minor key corresponding to the key signature represented by said portions of said key-shaped members.

3. The music teaching aid of claim 2 in which said portions are in the form of pointed protrusions and said protrusions are respectively provided with indicia indicating the sharps represented thereby.

4. The music teaching aid of claim 2 in which said portions are in the form of squared protrusions, and said protrusions are respectively provided with indicia indicating the flats represented thereby.

* * * * *